United States Patent

[11] 3,566,838

| [72] | Inventor | William A. Edwards |
| | | 347 South Division, Harvard, Ill. 60033 |
| [21] | Appl. No. | 841,075 |
| [22] | Filed | July 11, 1969 |
| [45] | Patented | Mar. 2, 1971 |

[54] ANIMAL COMMODE
3 Claims, 3 Drawing Figs.

[52] U.S. Cl. .................................................... 119/1
[51] Int. Cl. .................................................. A01k 1/00,
     A01k 23/00
[50] Field of Search ........................................ 119/1;
     4/118, 131, 221

[56] References Cited
UNITED STATES PATENTS

| 2,732,564 | 1/1956 | Potts | 4/131 |
| 2,971,493 | 2/1961 | Robb | 119/1 |
| 3,141,441 | 7/1964 | Russell | 119/1 |

Primary Examiner—Hugh R. Chamblee
Attorney—Elmer L. Zwickel

ABSTRACT: An animal commode comprised of a shallow pan having a nonskid bottom surface and formed with an internal flange adjacent to its top edge to support a platform that can be turned over readily to deposit excrement thereon into the pan. A heater element is enclosed within the pan for drying out the excrement.

PATENTED MAR 2 1971

3,566,838

Inventor
William A. Edwards
Charles H. Redman
Atty.

ANIMAL COMMODE

This application discloses improvements over the animal commode disclosed and claimed in my copending application, Ser. No. 633,738, filed Apr. 26, 1967 now U.S. Pat. No. 3,455,277.

The invention relates to improvements in animal commodes and is particularly concerned with the construction and assembly of a commode especially useful within a home or other confined area. The commode is characterized by the use of a shallow pan or receptacle having a heater element enclosed therein. A platform, made of nonporous material, such as stoneboard, is seated loosely over the open top of the pan so that excrement deposited thereon by an animal may be deposited into the pan by simply turning the platform over after use. The excrement thus deposited into the pan will be dried out by the heater means and dried excrement solids or ash may be later removed. Vapor and odors are disposed of through a suitable vent leading outside the room or other area.

It is, therefore, an object of the invention to provide a commode of the character referred to.

Another object is to provide an animal commode of the character referred to with a collection platform of nonporous material.

Another object is to provide the commode with a pan having novel means to support a collection platform spaced from its bottom.

Another object is to provide an animal commode with a nonskid bottom surface.

Another object is to provide the commode pan with an interiorly-arranged heater unit.

Another object is to provide a structure of the character referred to which is not expensive or difficult to manufacture, occupies but a minimum of space and which is very efficient in use.

Other objects and advantages of the invention will become apparent with reference to the following description and accompanying drawings.

Figure 1:
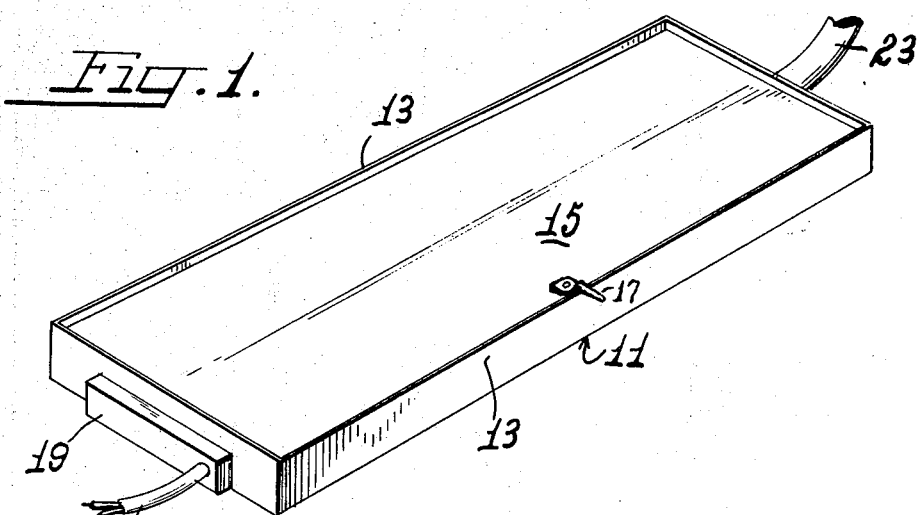
FIG. 1 is a perspective view of the commode.
Figure 2:
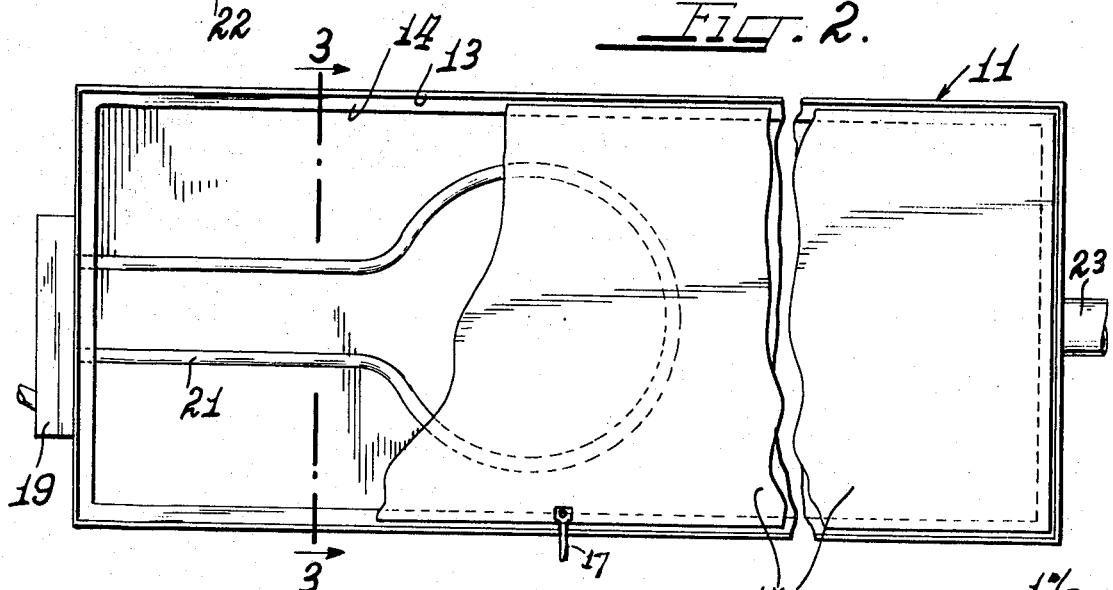
FIG. 2 is a top plan view of the commode showing parts of the platform broken away; and, FIG. 3 is a lateral sectional view of the commode, taken substantially on line 3-3 of FIG. 2.
Figure 3:
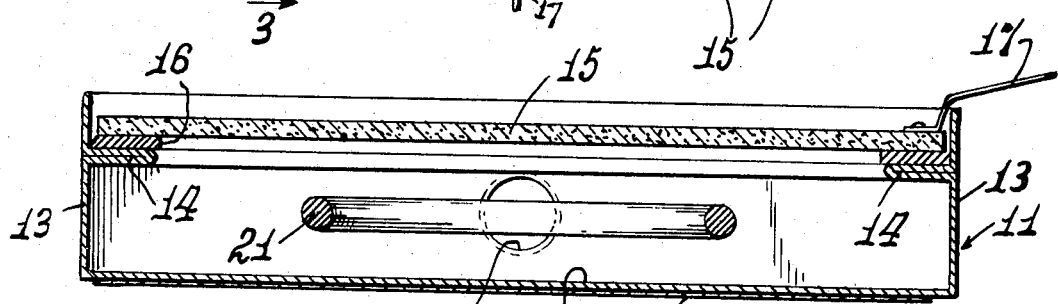

Referring to the exemplary disclosure of the animal commode shown in the accompanying drawings, the commode comprises a shallow rectangular pan 11 having a bottom wall 12 and upstanding perimeter walls 13. The perimeter walls each have an inturned fold or crimp 14, closely adjacent to their upper edges to define a perimeter flange of double material thickness, upon which is seated a platform 15. This platform may be of any suitable nonporous nonabsorbing material, such as stoneboard. A gasket 16 preferably is arranged on the flange 14 beneath the platform so as to substantially seal the interior of the pan from the surrounding atmosphere.

The platform 15 is provided with one or more strap handles 17 to facilitate its removal and the bottom surface of the pan 11 is provided with a nonskid surface such as, by way of example, a layer 18 of emory cloth, rubber, or like material.

Arranged at one end of the pan 11 is a juncture box 19 which carries calrod heater element 21 that extends into the pan and preferably is spaced from the bottom wall thereof. An electrical conductor 22, leading from the juncture box provides a connection with an electrical outlet leading from an electrical power source. A vent conduit 23 leads from the other end of the pan. Obviously, various other heating means such as gas, infrared, etc. may be used.

While not shown, a thermostat or other temperature control may be inserted into whatever heating system is used. Also, an "on-off" switch or like device may be used.

In use, when an animal deposits excrement onto the top surface of platform 15, said platform is then turned over by the handle 17 so as to deposit the excrement into the pan 11. The heater 21 is then heated so as to provide heat for drying out the excrement after which any solids, in the form of ash, may be removed from the pan and disposed of. This ash will be odorless.

Although I have described a preferred embodiment of my invention, in considerable detail, it will be understood that the description thereof is intended to be illustrative, rather than restrictive, as details of the structure may be modified or changed without departing from the spirit or scope of the invention. Accordingly, I do not desire to be restricted to the exact construction described.

I claim:

1. An animal commode comprising, in combination, a shallow pan having an imperforate bottom wall and upstanding perimeter walls, an internal crimped flange formed in each perimeter wall closely adjacent to the top edges thereof, a gasket seated on said internal flange, a heater element arranged within said pan beneath the plane of said flanges, a platform top seated on said flanges to substantially seal the interior of the pan from external atmosphere, a vent for said pan interior, and means on the platform engageable to facilitate its removal from the pan.

2. The commode recited in claim 1, in which the bottom surface of the pan has a friction surface.

3. The commode recited in claim 1, in which a layer of nonskid material is arranged on the bottom surface of the pan bottom wall.